United States Patent [19]

Kurtz

[11] Patent Number: 5,168,750
[45] Date of Patent: Dec. 8, 1992

[54] APPARATUS FOR TESTING THE BRAKES OF MOTOR VEHICLES

[75] Inventor: Günter Kurtz, Überherrn, Fed. Rep. of Germany

[73] Assignee: Ekuma Werkzeug-und Maschinenbau GmbH, Merzig, Fed. Rep. of Germany

[21] Appl. No.: 745,223

[22] Filed: Aug. 14, 1991

[51] Int. Cl.⁵ .......................................... G01M 19/00
[52] U.S. Cl. ...................................................... 73/132
[58] Field of Search ....................... 73/132, 117, 862.64

[56] References Cited

U.S. PATENT DOCUMENTS

| | | | |
|---|---|---|---|
| 3,295,368 | 1/1967 | Nevius | 73/862.64 X |
| 3,662,593 | 5/1972 | Pirrello | 73/132 |
| 4,186,595 | 2/1980 | Domitter | 73/132 |
| 4,307,604 | 12/1981 | Domitter | 73/121 |
| 4,771,387 | 9/1988 | Hexel et al. | 73/132 X |

Primary Examiner—Jerry W. Myracle
Attorney, Agent, or Firm—Peter K. Kontler

[57] ABSTRACT

Apparatus for testing the brake system of a motor vehicle has a housing which can be coupled to the rails for the driver's seat and supports a drive for a reciprocable depressing unit for the brake pedal. The depressing unit has a rear section which is movable by the drive and a front section which is movable with and relative to the rear section. When a cap at the front end of the front section engages and depresses the pedal, the cap is first moved against the opposition of a weak coil spring relative to a rear portion of the front section to thus close a switch in the circuit of two potentiometers, and the front section is thereupon moved relative to the rear section against the opposition of a helical compression coil spring. One of the potentiometers measures the distance which is covered by the rear section and the other potentiometer measures the distance which is covered by the front section relative to the rear section of the depressing unit. Signals from the potentiometers are transmitted to an electronic evaluating circuit which ascertains the force which is needed for depression of the pedal on the basis of signals from the other potentiometer and by taking into consideration the characteristic of the compression coil spring. The circuit further ascertains the difference between the signals from the potentiometers to thus determine the extent of depression of the brake pedal.

20 Claims, 2 Drawing Sheets

APPARATUS FOR TESTING THE BRAKES OF MOTOR VEHICLES

BACKGROUND OF THE INVENTION

The invention relates to improvements in apparatus for testing the brake systems of motor vehicles, and more particularly to improvements in testing apparatus of the type wherein a mobile depressing unit can engage and depress the pedal of the brake system in a motor vehicle.

It is already known to employ a portable brake testing apparatus which can be installed in a motor vehicle and has means for depressing the brake pedal. An apparatus employing such depressing means can be equipped with an integrated distance sensing device to monitor the distance which is covered by the depressing means, and with an integrated force sensing device to generate signals denoting the magnitude of force which is required to depress the pedal in order to achieve a certain braking action. Reference may be had to German Pat. No. 29 28 153 which proposes to affix a stationary part of the testing apparatus to the steering column and to employ a pneumatic motor which can move a plunger or a like part against the brake pedal. The plunger includes three rods the front end portions of which are connected to each other by a crosshead. The distance sensing means of the patented apparatus is a rotary encoder or a pulse generator and is actuated by one of the rods which form part of the pneumatically movable plunger. The force sensing means of the patented apparatus includes a load cell which is installed in the crosshead. A drawback of the patented apparatus is that its measurements are not sufficiently reliable, especially as concerns the indications which are furnished by the force sensing means.

Similar brake testing apparatus are disclosed in U.S. Pat. Nos. 4,186,595 and 4,307,604. A somewhat different brake testing apparatus is disclosed in U.S. Pat. No. 3,662,593.

OBJECTS OF THE INVENTION

An object of the invention is to provide an apparatus which can be used for the testing of brake systems of motor vehicles and is more accurate and more reliable than heretofore known testing apparatus.

Another object of the invention is to provide the apparatus with a novel and improved means for depressing the brake pedal in a motor vehicle.

A further object of the invention is to provide an apparatus which can be used to test the brake systems of motor vehicles without any changes or with negligible changes of such vehicles for the purpose of putting the improved apparatus to use therein.

An additional object of the invention is to provide the apparatus with novel and improved means for ascertaining the extent of depression of a brake pedal and with novel and improved means for ascertaining the magnitude of the force which is required to depress the brake pedal.

Still another object of the invention is to provide a novel and improved housing for the above outlined testing apparatus.

An additional object of the invention is to provide novel and improved means for moving the mobile parts of the above outlined testing apparatus.

A further object of the invention is to provide the apparatus with novel and improved means for automatically initiating a testing operation during a selected stage of depression of the brake pedal.

Another object of the invention is to provide a novel and improved method of operating the above outlined testing apparatus.

An additional object of the invention is to provide the apparatus with novel and improved means for shielding certain sensitive parts from dust and/or other contaminants.

A further object of the invention is to provide an apparatus which operates properly in spite of eventual deformation of the frame of the motor vehicle as a result of depression of the brake pedal by a mobile unit which reacts against the frame.

Another object of the invention is to provide an apparatus which can be put to use in a number of different motor vehicles.

SUMMARY OF THE INVENTION

The invention is embodied in a testing apparatus for the pedal-operated brake system of a motor vehicle. The improved apparatus comprises a housing which is fixedly positionable in the vehicle in front of the depressible pedal of the brake system (e.g., by coupling the housing to the rail or rails for the normally adjustable driver's seat in the motor vehicle), a pedal depressing unit which is movably installed in and extends from the housing toward the pedal when the housing is positioned in the vehicle, and means for moving the depressing unit relative to the housing toward and against the pedal so that the unit applies to the pedal a depressing force. The depressing unit comprises a rear section which is connected with the moving means, a front section which is preferably coaxial with and is movable relative to the rear section, guide means defining a predetermined path for movements of the front section relative to the rear section, and means for biasing the front section away from the rear section. The apparatus further comprises a first distance monitoring device including signal generating means for sensing the distance which is covered by the depressing unit relative to the housing, and means for sensing the force which is applied against the pedal. The force sensing means comprises a second distance monitoring device having signal generating means for sensing the distance which is covered by the front section relative to the rear section against the opposition of the biasing means and as a result of resistance which is offered by the pedal to depression by the front section of the depressing unit.

In accordance with a presently preferred embodiment, the biasing means comprises a helical compression coil spring which reacts against the rear section and bears against the front section of the depressing unit and has a length of at least 28 mm. The apparatus preferably further comprises electronic evaluating means for modifying signals from the distance sensing means of the second distance monitoring device as a function of the characteristic of the coil spring, and for generating signals denoting the difference between the distance sensing means of the first and second distance monitoring devices.

The guide means can comprise a forwardly projecting rod-like extension of the rear section of the depressing unit, and the front section preferably comprises a sleeve which surrounds the extension and defines with the extension a compartment for the biasing means. Such sleeve preferably comprises a first or rear portion which surrounds the compartment for the biasing means, and a second or front portion. The guide means preferably further comprises a bearing between the extension and the second portion of the sleeve. The helical compression coil spring which preferably constitutes or forms part of the biasing means reacts against the rear section (e.g., against a retainer on the extension) and bears against the second portion of the sleeve. To this end, the second portion of the sleeve can include an internal collar or partition, and the spring bears against such collar of the second portion of the sleeve.

The extension can carry or can comprise a stop, and the spring of the biasing means is preferably stressed to urge the sleeve against the stop in the absence of application of a depressing force to the brake pedal.

The front section of the depressing unit can further comprise a carrier (e.g., in the form of a casing) which is connected with and extends forwardly beyond the sleeve. Means can be provided to prevent rotation of the carrier and of the sleeve about the extension, and such rotation preventing means can comprise a male component (e.g., an elongated pin) which is provided on the extension, and a female component (e.g., a sleeve-like part) which is provided on the sleeve. The male component extends into the female component and the latter is reciprocable along the extension and relative to the male component. The male component can be provided on the aforementioned stop for the sleeve.

The second distance monitoring device is preferably supported by (e.g., installed in) the carrier of the front section of the depressing unit. Such second distance monitoring device can comprise a first portion which is connected with the extension (e.g., to the aforementioned stop of the extension) and a second portion which shares the movements of the sleeve relative to the extension. If the second distance monitoring device is or includes a potentiometer, the second portion of such distance monitoring device preferably constitutes the coil of the potentiometer.

A bellows can be installed between the housing and the carrier of the front section of the depressing unit. To this end, the carrier can comprise a flange or wall which is connected with and is located in front of the bellows.

The carrier of the front section of the depressing unit can comprise a rear portion which is connected with the sleeve, a pedal-engaging front portion (e.g., in the form of a cap) which is movable relative to the rear portion, and a resilient element (e.g., a relatively weak compression coil spring) which operates between the front and rear portions of the carrier and serves to urge the front portion away from the rear portion. Such apparatus can further comprise a switch which is in circuit with at least one of the distance monitoring devices and is actuated (particularly closed) by the front portion and/or by the resilient element when the front portion of the carrier is displaced by a brake pedal against the resistance of the resilient element. The front portion of the carrier can include a sleeve-like part which is reciprocable along and surrounds the extension of the rear section of the depressing unit. The resilient element reacts against the extension and bears against the front portion of the carrier.

The aforementioned rotation preventing means can be designed to prevent rotation of the sleeve and the extension relative to each other as well as to prevent rotation of the front portion of the carrier on the extension. This can be achieved by providing the front portion with a second female component. The male component of the rotation preventing means extends into the second female component and the latter is reciprocable along the extension relative to the male component of the rotation preventing means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
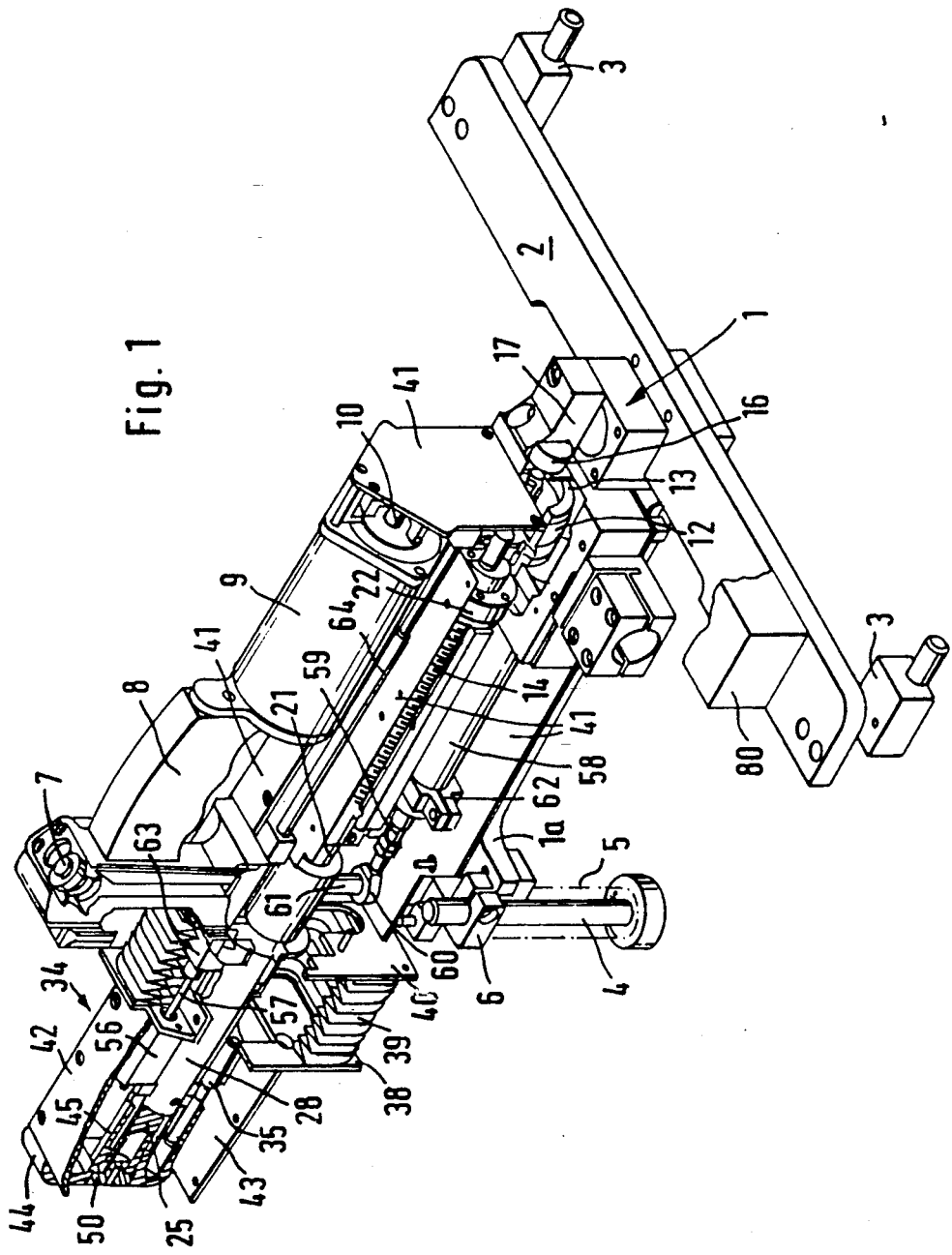
FIG. 1 is a perspective view of an apparatus which embodies one form of the invention, certain parts of the apparatus broken away.
Figure 2:
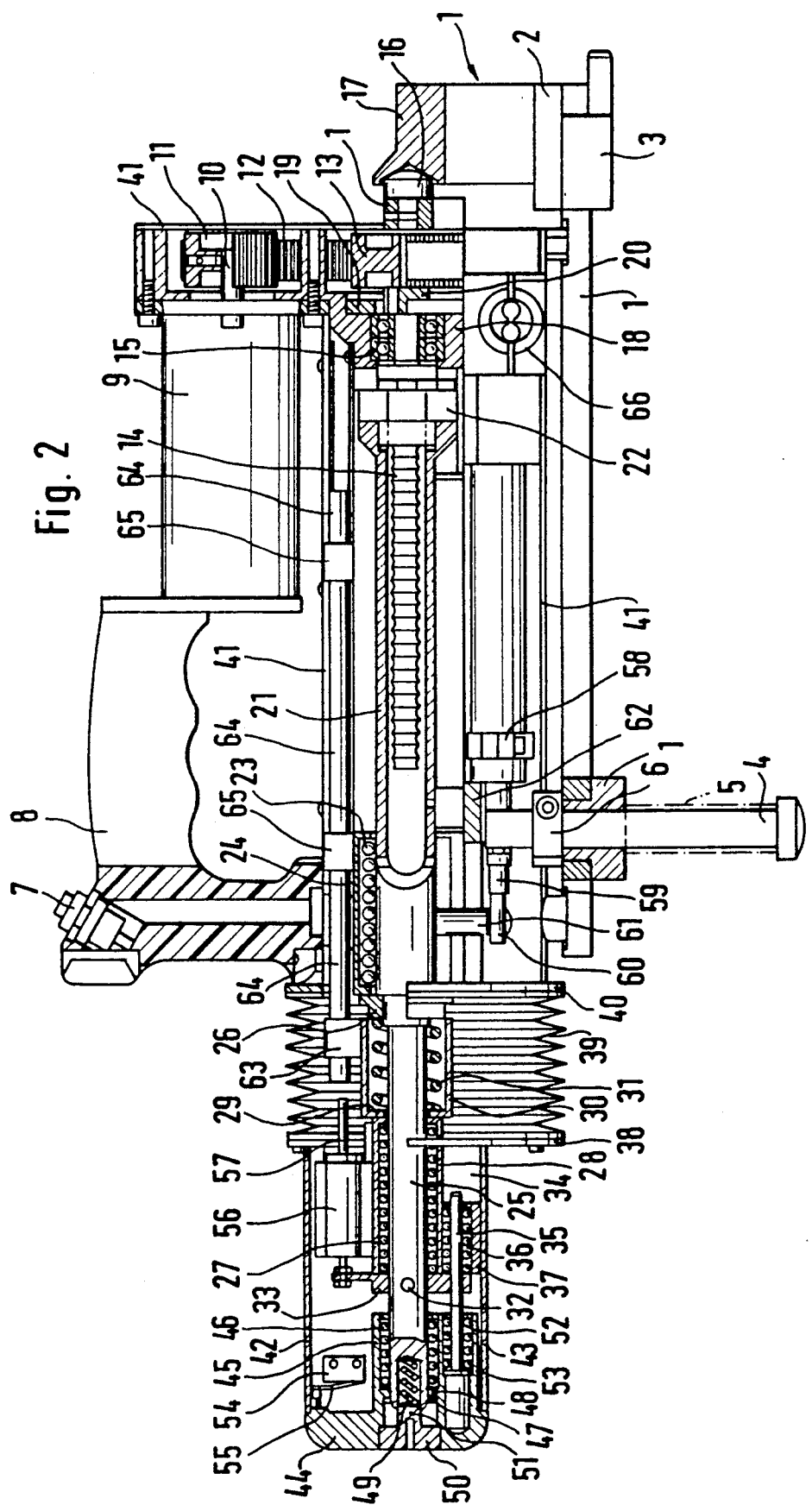
FIG. 2 is a partly elevational and partly central longitudinal vertical sectional view of the apparatus which is shown in FIG. 1.

The apparatus which is shown in FIGS. 1 and 2 is designed to test the brake systems of motor vehicles. A housing 1 has a transversely extending rear portion or crosshead 2 the ends of which carry combined supporting and coupling elements 3 engageable with the customary rails for the forwardly and rearwardly movable driver's seat in a motor vehicle to fixedly position the housing 1 relative to the chassis or frame of the motor vehicle. The front end portions of the rails for the driver's seat can be provided with holes or sockets for reception of the rearwardly projecting pin-shaped extensions of the coupling elements 3. The housing 1 carries two legs 4 (only one can be seen in the drawing) which come to rest on the floor in front of the driver's seat and are movable up and down relative to the housing against the opposition of and under the bias of coil springs 5. The lower end positions of the legs 4 are determined by stops 6 which engage laterally extending portions 1a of the housing 1 when the respective springs 5 are free to dissipate energy and to maintain the legs in their extended (lower end) positions.

The coupling elements 3 cooperate with the legs 5 to permit certain pivotal movements of the housing 1 about a substantially horizontal axis which extends transversely of the longitudinal direction of the apparatus. This enables the pedal-engaging front portion 44 of a carrier or casing 34 forming part of a front section of a pedal depressing unit of the apparatus to follow the downward movement of the engaged portion of the brake pedal when the latter is depressed in response to forward movement of the front section of the depressing unit.

The upper portion of the housing 1 is rigidly connected with a handle 8 which carries a starter button or knob 7, and with the casing or housing of a stepping motor 9. The output element 10 of the stepping motor 9 carries a first toothed pulley 11 which drives a second toothed pulley 13 by way of an endless toothed belt 12. The pulley 13 transmits torque to the feed screw 14 of a ball screw drive and is mounted in an angular contact ball bearing 15. The rear end of the feed screw 14 carries a bolt 16 forming part of a thrust bearing and having a spherical head extending into a complementary socket 17 of the housing 1. The bearing 15 is installed in a flange 18 of the housing 1 and is held therein by a disc 19. A nut 20 is provided to regulate the play of the angular contact ball bearing 15.

The feed screw 14 constitutes the output element of the means for moving the aforementioned depressing unit for the pedal of the brake system which is to be tested. The first or rear section of the depressing unit includes a hollow tubular member or bar 21 which surrounds the feed screw 14 and the rear end portion of which constitutes or supports a spherical nut 22 mating with the feed screw. The illustrated nut 22 constitutes an enlargement at the rear end of the bar 21. The means for guiding the bar 21 during movement in response to rotation of the feed screw 14 comprises a rail (not shown) on or in the housing 1 and a spherical sleeve 23 in a receptacle 24 of the housing 1. The bar 21 is provided with an elongated smaller-diameter extension 25 which projects forwardly toward the pedal of the brake system to be tested. The extension 25 is or can be solid, i.e., it need not be provided with an axial bore corresponding to that provided in the main or rear portion of the bar 21 and serving to receive the feed screw 14. A nut 26 is mounted on an externally threaded portion of the bar 21 to serve as an axially adjustable retainer for the rearmost convolution of a helical compression coil spring 31 serving as a means for biasing the front section of the depressing unit relative to the rear section including the bar 21 and its extension 25.

The front section of the depressing unit comprises a composite sleeve including a front portion 28 having an inwardly extending collar or partition 29, and a rear portion 30 which defines with the adjacent portion of the extension 25 an annular compartment for the convolutions of the coil spring 31. The latter reacts against the nut 26 on the bar 21 of the rear section of the depressing unit and bears against the collar 29 to urge the composite sleeve 28-30 forwardly, i.e., away from the feed screw 14 of the means for moving the pedal depressing unit relative to the housing 1. The front portion 28 of the composite sleeve 28-30 surrounds two spherical bearing sleeves 27 which form part of the guide means for the front section of the depressing unit. The two sections of the depressing unit are coaxial and guide means for the front section (including the sleeve 28-30) further comprises the aforementioned extension 25 of the bar 21.

The extent of movability of the composite sleeve 28-30 relative to the rear section (in a direction away from the feed screw 14) comprises a stop 33 which is preferably detachably and adjustably secured to the extension 25 in front of the sleeve 28-30 by a pin 32. The spring 31 has a minimum axial length of 28 mm and is installed in the compartment within the sleeve portion 30 in stressed condition so that it tends to dissipate energy and to maintain the sleeve portion 28 in abutment with the stop 33 when the front section of the depressing unit is not called upon to depress the pedal of a brake system in a motor vehicle.

The front section of the depressing unit further comprises a carrier here shown as a casing 34 which is rigid with the composite sleeve 28-30. The apparatus further comprises means for preventing rotation of the composite sleeve 28-30 (and hence of the carrier or casing 34) relative to the extension 25. The illustrated rotation preventing means comprises a male component 35 in the form of a pin or stud which is parallel to the extension 25 and is secured to the stop 33, and a female component 36 in the form of a spherical sleeve-like bearing member installed in a cartridge or cage 37 of the front portion 28 of the sleeve 28-30. The female component 36 is movable back and forth longitudinally of the extension 25 in that it is reciprocable relative to the male component 35.

The rear end of the carrier or casing 34 has or is connected with a flange or wall 38 which can be said to be rigid with the composite sleeve 28-30 and is connected with the front end of a collapsible bellows 39. The rear end of the bellows 39 is connected to a second flange or wall 40 which is affixed to the front end of a shell 41 constituting a component part of or connected to the housing 1. The bellows 39 surrounds the rear portion 30 of the composite sleeve 28-30. The dimensions and the shape of the rear flange or wall 40 can match those of the front flange or wall 38.

The carrier or casing 34 of the front section of the depressing unit comprises a top wall 42 which is secured to the wall or flange 38 by screws, bolts or other suitable fasteners, and a bottom wall 43 which is also screwed, bolted or otherwise fastened to the flange or wall 38. The walls or flanges 42, 43 can be said to constitute or form part of a rear portion of the casing 34, and the latter further comprises the aforementioned preferably sturdy and rigid front portion 44 in the form of a cap which is movable, within limits, axially of the extension 25 toward and away from the rear portion including the walls 42, 43. The front end face of the cap 44 has a rounded marginal portion with gradual transition into the external surfaces of the walls 42 and 43. The central portion of the cap 44 is constituted by a sleeve-like part 45 which surrounds a spherical bearing sleeve 46 which, in turn, surrounds the front end portion of the extension 25. The means for preventing separation of the cap 44 from the extension 25 comprises a split ring 47 which extends into an external groove in the periphery of the front end of the extension 25 and is located in front of an internal collar 48 constituting the foremost part of the sleeve 45.

The front end face of the cap 44 has a centrally located preferably tapped bore or hole for the head of a closure 50 having a shank 51 serving to engage one end convolution of a resilient element here shown as a relatively weak coil spring 49 installed in a socket in the front end face of the extension 25. The spring 49 tends to move the cap 44 forwardly and away from the rear portion (including the walls 42, 43) of the carrier or casing 34 so that the internal collar 48 normally abuts the split ring 47. The extent of movability of the cap 44 against the opposition of the spring 49 (i.e., under the action of a brake pedal which is engaged by the exposed front end face of the cap 44) is determined by the front end faces of the walls 42, 43.

The means for preventing rotation of the cap 44 relative to the walls 42, 43 and extension 25 includes the aforementioned male component 35 on the stop 33 and a second female component 53 in the form of a sleeve forming part of the cap 44 and surrounding a spherical bearing 52 which, in turn, surrounds and is reciprocable along the front portion of the male component 35.

When the cap 44 is depressed against the opposition of the spring 49 so that its rear end face abuts the walls 42, 43 of the carrier or casing 34, it actuates (closes) an electric switch 54 which is installed in the carrier or casing and is in circuit with at least one of two distance monitoring devices 56-57 (this monitoring device is a potentiometer having a coil 56 mounted on the front portion 28 of the composite sleeve 28-30 and a rod 57 connected to a radially projecting portion of the stop 33 on the extension 25) and a second distance monitoring device 58-59 in or on the housing 1. The inner side of the front wall of the cap 44 has a rearwardly extending protuberance 55 which actuates the switch 54 when the cap 44 is depressed and causes the spring 49 to store additional energy.

The distance monitoring device 58-59 includes or constitutes a second potentiometer which is installed in or on the shell 41 of the housing 1 and is secured to the shell by one or more clamps 62 or in any other suitable way. The rod 59 of the potentiometer 58-59 is connected with a radially extending arm 61 of the bar 21 by a universal joint 60.

The rear portion 30 of the composite sleeve 28-30 carries a block 63 for a tube 64 having two spaced-apart ring-shaped followers 65 slidable in the shell 41 of the housing 1. The tube 64 serves as a sheath for electric conductors (not specifically shown) connecting the switch 54 and the potentiometer 56-57 with an electronic evaluating circuit 80. The conductors which extend beyond the rear end of the tube or sheath 64 are preferably looped so as to enable the tube 64 to move with the front section of the depressing unit relative to the electronic evaluating circuit 80.

The reference character 66 denotes a connector for a cable (not shown) which is used to supply electrical energy to current-consuming parts (including the stepping motor 9) of the testing apparatus. The stepping motor 9 can be started by the knob 7 on the handle 8.

When the stepping motor 9 is started to drive the belt transmission 11-13 of the means for moving the rear section (including the hollow bar 21) of the depressing unit relative to the housing 1, the pulley 13 of the belt transmission 11-13 rotates the feed screw 14 which causes the front and rear sections of the depressing unit to move forwardly. This entails a stretching of the bellows 39 which is connected to the housing 1 by the flange or wall 40 and to the carrier or casing 34 by the wall or flange 38. The tube or sheath 64 and the conductor portions therein move with the bar 21 and its extension 25. The front end face of the cap 44 comes into engagement with and ultimately depresses the pedal of the brake system in the motor vehicle wherein the housing 1 is installed in front of the driver's seat so that the legs 5 abuts the floor. The brake pedal offers resistance to depression and causes the cap 44 to move relative to the walls 42, 43 of the rear portion of the carrier or casing 34 so that the spring 49 stores additional energy and the protuberance 55 of the cap 44 closes the electric switch 54. The distance which the cap 44 covers relative to the walls 42, 43 can be in the range of 1-2 mm. Closing of the switch 54 ensures that the monitoring and recording means of the testing apparatus can record and/or indicate the results of the test, e.g., in the form of a force-distance diagram. The bias of the spring 49 is preferably selected in such a way (for example, such bias can be in the range of 3-4N) that this spring yields and permits closing of the switch 54 when the idle stroke or play of the brake pedal is already completed or eliminated, i.e., when a certain minimal force is required to effect depression of the brake pedal by the cap 44 of the carrier or casing 34 (i.e., by the front section of the depressing unit).

When the resistance of the relatively weak spring 49 is overcome, i.e., when the cap 44 abuts the walls 42, 43 and maintains the switch 54 in closed position, further forward movement of the carrier or casing 34 results in rearward movement of the carrier or casing and sleeve 28-30 relative to the extension 25 and in attendant stressing of the spring 31 which operates between the extension 25 and the front portion 28 of the composite sleeve 28-30. Thus, the portion 28 of the sleeve 28-30 moves away from the stop 33 by sliding along the extension 25. The extent of such movement of the sleeve 28-30 relative to the extension 25 (i.e., the extent of stressing of the spring 31) is ascertained by the potentiometer 56-57 which transmits an appropriate signal to the evaluating circuit 80. The spring 31 is calibrated, and the circuit 80 is designed to transmit signals as a function of the characteristic of the spring 31 and denoting the force which is required to depress the brake pedal. The circuit 80 further comprises means for ascertaining and indicating the difference between the signals from the potentiometers 58-59 and 56-57, i.e., the difference between the distances covered by the extension 25 and the carrier casing 34, respectively. This results in measurement and indication of the actual distance covered by the depressed pedal.

All other manipulations of the improved apparatus, including pulsating movements, waiting times and others are or can be the same as in a conventional apparatus and need not be described here.

An important advantage of the improved testing apparatus is that the pedal depressing unit is divided into the aforementioned rear section (including the bar 21 and the extension 25) and front section (including the composite sleeve 28-30 and the carrier or casing 34). The extension 25 and the bearing sleeves 27 in the front portion 28 of the composite sleeve 28-30 cooperate to ensure that the front section of the depressing unit is confined to movements along a predetermined path with reference to the rear section. The potentiometer 56-57 transmits signals which denote the extent of axial movement of the front section relative to the rear section of the depressing unit, and the electronic evaluating circuit 80 modifies the signals from the potentiometer 56-57 as a function of the characteristic of the selected spring 31 and also generates signals denoting the difference between the signals from the potentiometers 56-57 and 58-59.

The novel testing apparatus is designed to ensure highly accurate measurements in spite of eventual minute or relatively small deformation of the chassis or frame of the motor vehicle in the region beneath the properly installed testing apparatus, particularly that deformation which is attributable to the force transmitted to the brake pedal from the cap 44 of the carrier or casing 34 when the improved testing apparatus is in use. Such deformation of the chassis or frame can result in distortion of signals which are generated by the load cell of the aforediscussed conventional testing apparatus. It has been found that the just discussed deformation of the chassis or frame of the motor vehicle as a result of depression of the brake pedal by the improved apparatus does not affect the accuracy of readings if the force sensing means is designed to ascertain the deformation of a helical coil spring (31) having a length such that a deformation corresponding to deformation brought about by the maximum anticipated deformation of the chassis or frame does not entail any appreciable changes in the bias of the spring. Therefore, the improved apparatus preferably employs a coil spring having a length of not less than 28 mm; this ensures that any deformation of this spring which is attributable to eventual deformation of the chassis or frame during depression of the brake pedal by the cap 44 does not cause any significant changes in the bias or force of the spring.

As used herein, the term "carrier" or "casing" (denoting the part 34) is intended to embrace any part or group of parts which can adequately support the cap 44 or an analogous pedal-engaging and depressing portion of the front section of the depressing unit. A genuine casing 34 is preferred at this time for a number of reasons, i.e., such casing can readily confine the means for preventing rotation of the composite sleeve 28-30 and of the cap 44 relative to the extension 25, and the casing 34 can also confine and shield the switch 54 and the potentiometer 56-57.

The friction bearing 36 need not necessarily be mounted in the cartridge or cage 37 of the front portion 28 of the composite sleeve 28-30; for example, such bearing can be mounted on the flange or wall 38 or on the bottom wall 43 of the carrier or casing 34.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A testing apparatus for the pedal-operated brake system of a motor vehicle, comprising a housing fixedly positionable in the vehicle in front of the depressible pedal of the brake system; a pedal depressing unit installed in and extending from the housing toward the pedal when the housing is positioned in the vehicle; means for moving said unit relative to said housing toward and against the pedal so that said unit applies against the pedal a depressing force, said unit comprising a rear section connected with said moving means, a front section coaxial with and movable relative to said rear section, guide means defining a path for movements of said front section relative to said rear section, and means for biasing said front section away from said rear section, said guide means comprising a forwardly projecting extension of said rear section and said front section comprising a sleeve surrounding said extension and defining with said extension a c compartment for said biasing means; a first distance monitoring device including signal generating means for sensing the distance which is covered by said unit relative to said housing; and means for sensing the force which is applied against the pedal, said force sensing means comprising a second distance monitoring device having signal generating means for sensing the distance covered by said front section relative to said rear section against the opposition of said biasing means and as a result of resistance offered by the pedal.

2. The apparatus of claim 1, wherein said biasing means comprises a coil spring which reacts against said rear section and bears against said front section and has a length of at least 28 mm, and further comprising electronic means for modifying signals from the distance sensing means of said second device as function of the characteristic of said spring and for generating signals denoting the difference between the signals from the distance sensing means of said first and second devices.

3. The apparatus of claim 1, wherein said sleeve comprises a first portion which surrounds said compartment and a second portion, said guide means further comprising a bearing between said extension and the second portion of said sleeve.

4. The apparatus of claim 1, wherein said biasing means comprises a helical compression coil spring which reacts against said rear section and bears against the second portion of said sleeve.

5. The apparatus of claim 4, wherein said extension comprises a stop and said spring is stressed to urge said sleeve against said stop in the absence of application of depressing force by said unit.

6. The apparatus of claim 4, wherein the second portion of said sleeve includes an internal collar and said spring bears against said collar.

7. The apparatus of claim 1, wherein said front section further comprises a carrier connected with and extending forwardly beyond said sleeve.

8. The apparatus of claim 7, further comprising means for preventing rotation of said carrier and said sleeve about said extension.

9. The apparatus of claim 8, wherein said rotation preventing means comprises a male component provided on said extension and a female component provided on said sleeve, said male component extending into said female component and said female component being reciprocable along said extension relative to said male component.

10. The apparatus of claim 9, wherein said extension comprises a stop and said spring is stressed to urge said sleeve against said stop in the absence of application of depressing force by said unit, said male component being provided on said stop.

11. The apparatus of claim 7, wherein said second distance monitoring device is supported by said carrier.

12. The apparatus of claim 11, wherein said second distance monitoring device comprises a first portion connected with said extension and a second portion which shares the movements of said sleeve relative to said extension.

13. The apparatus of claim 12, wherein said extension comprises a stop and said spring is stressed to urge said sleeve against said stop in the absence of application of depressing force by said unit, said first portion of said second distance monitoring device being connected to said stop.

14. The apparatus of claim 12, wherein said second distance monitoring device is a potentiometer and said second portion includes a coil.

15. The apparatus of claim 7, further comprising a bellows between said housing and said carrier.

16. The apparatus of claim 15, wherein said carrier includes a flange which is connected with said bellows.

17. The apparatus of claim 7, wherein said carrier includes a rear portion connected with said sleeve, a pedal-engaging front portion movable relative to said rear portion, and a resilient element operating between said front and rear portions and arranged to urge said front portion away from said rear portion, and further comprising a switch in circuit with at least one of said distance monitoring devices and actuated by said front portion when the front portion is displaced by a pedal against the resistance of said resilient element.

18. The apparatus of claim 17, wherein said front portion includes a sleeve which is reciprocable along and surrounds said extension, said resilient element reacting against said extension and bearing against said front portion.

19. The apparatus of claim 17, further comprising means for preventing rotation of said sleeve and said front portion relative to said extension, said rotation preventing means comprising a male component provided on said extension and female components provided on said sleeve and said front portion, said male component extending into said female components and said female components being reciprocable along said extension relative to said male component.

20. A testing apparatus for the pedal-operated brake system of a motor vehicle, comprising a housing fixedly positionable in the vehicle in front of the depressible pedal of the brake system; a pedal depressing unit movably installed in and extending from the housing toward the pedal when the housing is positioned in the vehicle, means for moving said unit relative to said housing toward and against the pedal so that said unit applies against the pedal a depressing force, said unit comprising a rear section connected with said moving means, a front section coaxial with and movable relative to said rear section, guide means defining a path for movements of said front section relative to said rear section, and means for biasing said front section away from said rear section, said biasing means comprising a coil spring which reacts against said rear section and bears against said front section and has a length of at least 28 mm; a first distance monitoring device including signal generating means for sensing the distance which is covered by said unit relative to said housing; means for sensing the force which is applied against the pedal, said force sensing means comprising a second distance monitoring device having signal generating means for sensing the distance covered by said front section relative to said rear section against the opposition of said biasing means and as a result of resistance offered by the pedal; and electronic means for modifying signals from the distance sensing means of said second device as a function of the characteristic of said spring and for generating signals denoting the difference between the signals from the distance sensing means of said first and second devices.

* * * * *